(12) United States Patent
Mancl et al.

(10) Patent No.: US 10,840,781 B2
(45) Date of Patent: Nov. 17, 2020

(54) COMMUTATOR BRUSH AND ROLLED-UP SPRING ASSEMBLY

(71) Applicants: Dennis J. Mancl, Bluff City, TN (US); Leonard J. Lavasser, Randolph, VT (US)

(72) Inventors: Dennis J. Mancl, Bluff City, TN (US); Leonard J. Lavasser, Randolph, VT (US)

(*) Notice: Subject to any disclaimer, the term of this patent is extended or adjusted under 35 U.S.C. 154(b) by 310 days.

(21) Appl. No.: 16/141,882

(22) Filed: Sep. 25, 2018

(65) Prior Publication Data

US 2020/0099276 A1 Mar. 26, 2020

(51) Int. Cl.

| | |
|---|---|
| *H02K 13/10* | (2006.01) |
| *H02K 5/14* | (2006.01) |
| *H01R 39/38* | (2006.01) |
| *H01R 39/415* | (2006.01) |
| *H02K 5/16* | (2006.01) |
| *H02K 7/14* | (2006.01) |
| *H02K 9/06* | (2006.01) |
| *H02K 7/08* | (2006.01) |
| *H02K 13/00* | (2006.01) |
| *H01R 39/40* | (2006.01) |

(52) U.S. Cl.
CPC ........... *H02K 13/10* (2013.01); *H01R 39/381* (2013.01); *H02K 5/148* (2013.01); *H02K 5/161* (2013.01); *H02K 7/083* (2013.01); *H02K 7/14* (2013.01); *H02K 9/06* (2013.01); *H02K 2205/09* (2013.01)

(58) Field of Classification Search
CPC ........ H01R 39/38; H01R 39/27; H01R 39/26; H01R 39/381; H01R 39/40; H01R 39/415; H01R 39/41; H02K 5/148; H02K 5/14; H02K 5/143; H02K 13/10

See application file for complete search history.

(56) References Cited

U.S. PATENT DOCUMENTS

| 2,695,968 A | 11/1954 | Welch et al. | |
|---|---|---|---|
| 2,802,960 A * | 8/1957 | Baker | H01R 39/40 310/246 |
| 2,836,745 A | 5/1958 | Gillie | |
| 2,862,124 A * | 11/1958 | Huber | H01R 39/40 310/246 |
| 2,974,241 A | 3/1961 | Harter | |

(Continued)

FOREIGN PATENT DOCUMENTS

EP 1805868 A1 7/2007

*Primary Examiner* — Edgardo San Martin
(74) *Attorney, Agent, or Firm* — bobharter.com; Robert J. Harter (57) ABSTRACT

A universal motor includes a commutator brush with a cavity for sheltering a constant force spring from a wire shunt. In some examples, the cavity can be formed by milling a blind hole into the brush such that an axial centerline of the hole is perpendicular to the brush's length. The cavity is near the back end of the brush, at the end farthest away from the commutator, but is also slightly forward to leave a rear portion of the brush to serve as a barrier between the wire shunt and the spring. The diameter of the cavity is slightly larger than the width of the brush, so the cavity creates a slot in the side of the brush. The slot allows part of the spring to reach out beyond the cavity to where the spring can hook onto a front edge of a stationary sleeve that supports the brush.

20 Claims, 4 Drawing Sheets

(56) References Cited

U.S. PATENT DOCUMENTS

| | | | | |
|---|---|---|---|---|
| 3,376,444 | A * | 4/1968 | Eaton, Jr. | H01R 39/40 310/249 |
| 3,387,155 | A | 6/1968 | Krulls | |
| 3,423,618 | A | 1/1969 | Schmid et al. | |
| 3,430,915 | A | 3/1969 | Vogelsberg | |
| 3,518,475 | A * | 6/1970 | McBroom, Jr. | H01R 39/381 310/245 |
| 3,521,102 | A * | 7/1970 | Sen | H01R 39/415 310/246 |
| 3,634,710 | A * | 1/1972 | Woda | H01R 39/40 310/239 |
| 3,735,173 | A * | 5/1973 | Wisniewski | H02K 5/148 310/242 |
| 3,864,803 | A * | 2/1975 | Ohmstedt | H01R 39/383 29/732 |
| 3,902,088 | A * | 8/1975 | Guglielmo | H01R 39/381 310/246 |
| 4,166,227 | A * | 8/1979 | Guglielmo | H01R 39/40 310/242 |
| 4,209,723 | A * | 6/1980 | Hamman | H02K 5/04 310/112 |
| 4,296,346 | A | 10/1981 | Ooki et al. | |
| 4,355,254 | A | 10/1982 | Oki et al. | |
| 4,366,404 | A | 12/1982 | Zigler | |
| 4,551,646 | A * | 11/1985 | Brown | H01R 39/41 29/597 |
| 5,043,619 | A * | 8/1991 | Kartman, Jr. | H01R 39/381 310/242 |
| 5,184,041 | A * | 2/1993 | Baer | H02K 5/148 310/239 |
| 5,256,925 | A | 10/1993 | Cutsforth | |
| 5,465,016 | A * | 11/1995 | Mancl | H02K 3/522 310/71 |
| 6,037,685 | A | 3/2000 | Berfield | |
| 6,652,360 | B2 | 11/2003 | Cutsforth | |
| 6,800,981 | B2 * | 10/2004 | Kuhlmann-Wilsdorf | H01R 39/381 310/239 |
| 6,952,062 | B1 * | 10/2005 | Mancl | F04D 29/122 310/85 |
| 7,034,430 | B2 | 4/2006 | Cutsforth et al. | |
| 7,053,516 | B2 | 5/2006 | Yu | |
| 7,059,038 | B2 | 6/2006 | Ortt et al. | |
| 7,122,935 | B2 | 10/2006 | Custforth et al. | |
| 7,141,906 | B2 | 11/2006 | Custforth et al. | |
| 7,169,022 | B2 | 1/2007 | Cutsforth | |
| 7,218,028 | B2 * | 5/2007 | Annis | H01R 39/381 310/240 |
| 7,417,354 | B2 | 8/2008 | Cutsforth et al. | |
| 7,545,072 | B2 | 6/2009 | Cutsforth | |
| 7,564,160 | B2 | 7/2009 | Cutsforth et al. | |
| 7,705,744 | B2 | 4/2010 | Cutsforth | |
| 7,768,174 | B2 | 8/2010 | Cutsforth et al. | |
| 7,816,834 | B2 | 10/2010 | Cutsforth | |
| 7,880,362 | B2 | 2/2011 | Cutsforth et al. | |
| 7,880,363 | B2 | 2/2011 | Cutsforth et al. | |
| 7,916,038 | B2 | 3/2011 | Cutsforth | |
| 7,960,892 | B2 | 6/2011 | Cutsforth | |
| 7,990,018 | B2 | 8/2011 | Cutsforth et al. | |
| 7,994,683 | B2 | 8/2011 | Cutsforth et al. | |
| 8,134,472 | B2 | 3/2012 | Cutsforth | |
| 8,179,014 | B2 | 5/2012 | Cutsforth et al. | |
| 8,493,707 | B2 | 7/2013 | Cutsforth | |
| 8,546,993 | B2 | 10/2013 | Cutsforth et al. | |
| 8,618,943 | B2 | 12/2013 | Cutsforth et al. | |
| 8,803,400 | B2 * | 8/2014 | Shirasaka | H01R 39/41 310/239 |
| 8,825,800 | B2 | 9/2014 | Cutsforth | |
| 8,922,092 | B2 | 12/2014 | Cutsforth | |
| 9,707,580 | B1 * | 7/2017 | Mancl | B05B 7/2491 |
| 9,711,924 | B2 * | 7/2017 | Wei | H01R 39/381 |
| 9,853,407 | B2 * | 12/2017 | Koenitzer | H02K 11/40 |
| 2006/0028091 | A1 * | 2/2006 | Xu | H02K 5/148 310/239 |
| 2009/0050459 | A1 * | 2/2009 | Ahn | H02K 5/148 200/400 |

* cited by examiner

COMMUTATOR BRUSH AND ROLLED-UP SPRING ASSEMBLY

FIELD OF THE DISCLOSURE

This disclosure relates generally to brush-type electric motors and more specifically to commutator brush and spring devices for such motors.

BACKGROUND

A brush-type electric motor is any electric motor that includes a commutator and at least one spring urging at least one commutator brush (e.g., a carbon-based or graphite block) against the commutator. Some example brush-type electric motors are known as a commutated motor, a brush-type permanent magnet motor, a permanent magnet direct current motor (PMDC), an AC series motor, a brush-type series motor, and a universal motor.

A universal motor can operate on AC or DC power. It is a commutated series-wound motor with a commutator and carbon brushes that connect the stator's field coils in series with the rotor windings. Universal motors can operate on AC because the current in both the field coils and the armature (and their respective magnetic fields) will alternate (reverse polarity) synchronously with the supply. The resulting mechanical torque will occur in a consistent direction of rotation, independent of the direction of applied voltage. The developed torque is determined by the commutator and polarity of the field coils.

Universal motors can have high starting torque, can run at high speed, and can be lightweight and compact. They are commonly used in portable power tools and household appliances. Universal motors are also relatively easy to control electronically or via selectively tapping various coil points.

DETAILED DESCRIPTION

Figure 1:
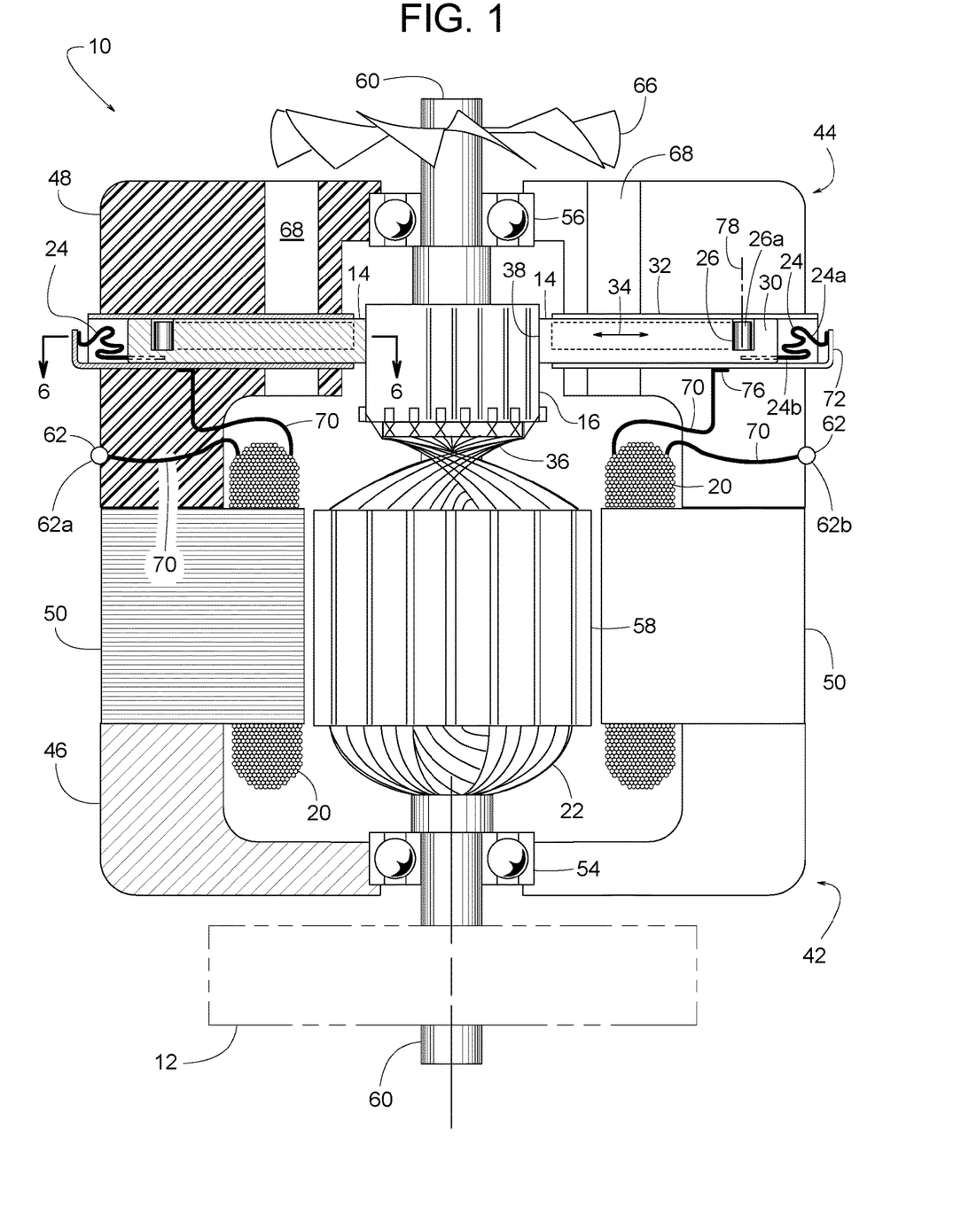
FIG. 1 is a cross-sectional side view of an example electric motor constructed in accordance with the teachings disclosed herein.
Figure 2:
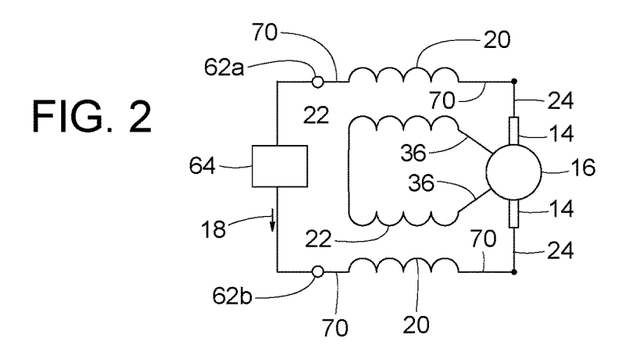
FIG. 2 is a schematic illustration of the motor shown in FIG. 1.

FIG. 1 shows an example electric motor 10 for rotating a driven member 12 (e.g., an impeller, a fan wheel, etc.). Motor 10 has a novel commutator brush 14 in sliding electrical contact with the motor's commutator 16. Brush 14 in sliding contact with commutator 16 conducts properly timed electrical current 18 between a stationary field winding 20 and a rotating rotor winding 22 of motor 10, e.g., as schematically illustrated in FIG. 2. A flexible stranded wire shunt 24 conveys current 18 to/from brush 14. A rolled-up spring 26, commonly known as a constant force spring, urges brush 14 against commutator 16. The term, "rolled-up spring" refers to a ribbon of spring steel that, when in the relaxed state, is wrapped upon itself. In some examples, a rolled-up spring encircles a central supporting post. The multiple wraps of a rolled-up spring are generally coaxially aligned with each other, as opposed to being axial spread out in a helical pattern.

To prevent wire shunt 24 from bunching up and jamming or otherwise interfering with spring 26, brush 14 shelters spring 26 within a cavity 28. Cavity 28 is at an intermediate position along the length of brush 14; thereby leaving brush 14 with a back end 30 that provides a protective barrier between wire shunt 24 and spring 26.

Figure 3:
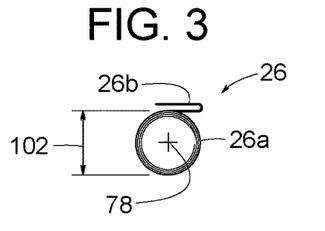
FIG. 3 is a top view of a spirally wrapped spring used in the motor shown in FIG. 1, wherein the spring is in its relaxed state.
Figure 4:
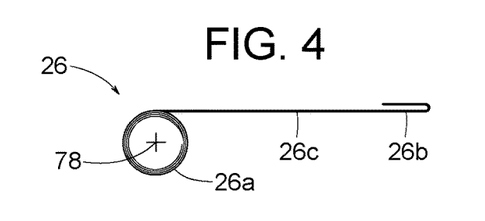
FIG. 4 is a top view similar to FIG. 3 but showing the spring partially extended in a resiliently stressed condition.
Figure 5:
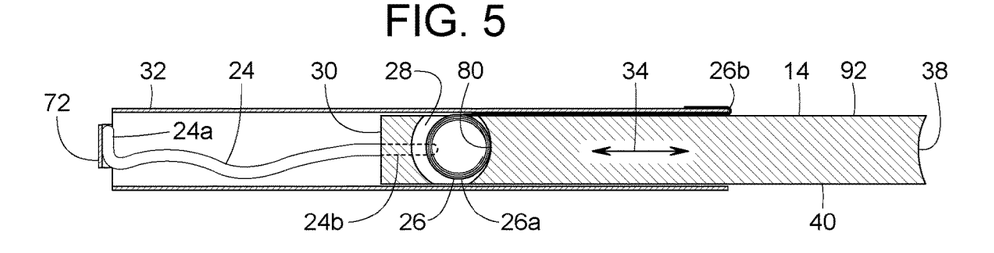
FIG. 5 is a cross-sectional view similar to FIG. 6 but showing the brush extended farther.
Figure 6:
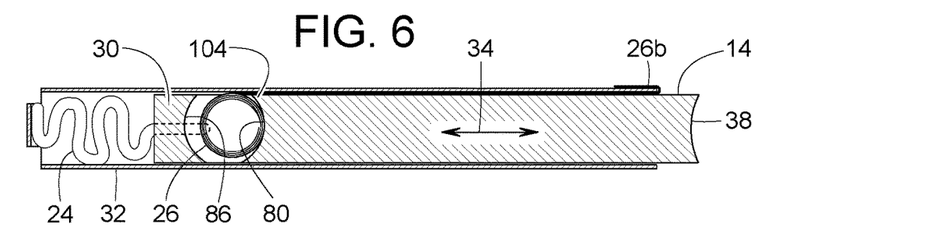
FIG. 6 is a cross-sectional view taken along line 6-6 of FIG. 1 but with the commutator not shown.
Figure 7:
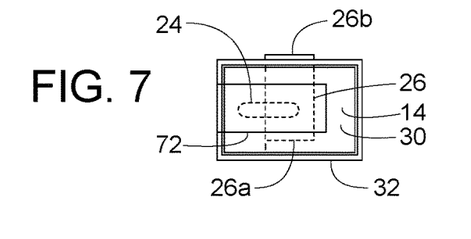
FIG. 7 is a left end view of FIG. 5.

FIG. 3 shows spring 26 in its normally relaxed shape, FIG. 4 shows spring 26 partially extended, FIG. 5 shows a wrapped section 26a of partially extended spring 26 contained within cavity 28, and FIG. 6 shows spring 26 further extended. FIG. 7 shows brush 14 housed in sliding relationship within a rectangular sleeve 32, which guides brush 14 in a longitudinal direction 34 toward commutator 16. In some examples, sleeve 32 is electrically conductive to establish an electrical connection between wire shunt 24 and a rotor winding lead 36 of rotor winding 22. The extendibility of spring 26, the flexibility of wire shunt 24, and brush 14 being able to slide within sleeve 32 provides accommodating adjustment for the brush's erosion of length as commutator 16, over extended use, abrades a front end 38 of brush 14.

Figure 8:
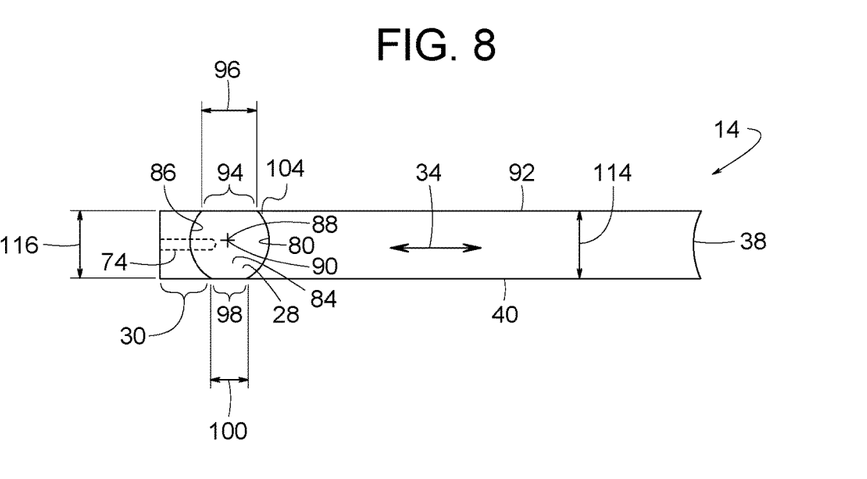
FIG. 8 is a top view of the commutator brush shown in FIGS. 1 and 5-7.
Figure 9:
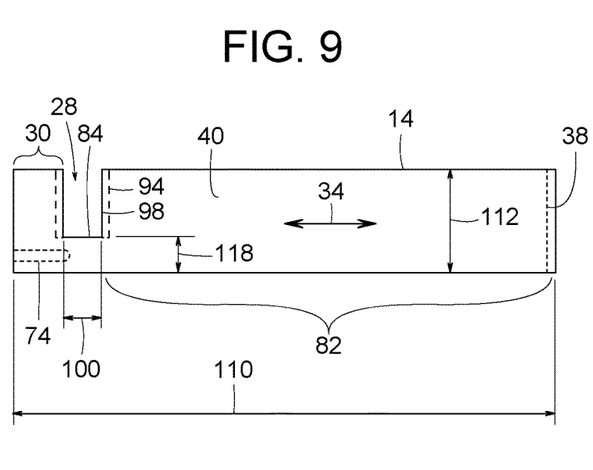
FIG. 9 is a front view of FIG. 8.
Figure 10:
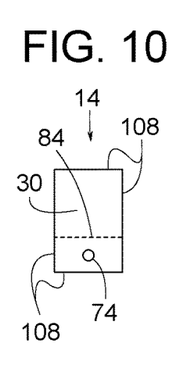
FIG. 10 is a left end view of FIG. 9.
Figure 11:
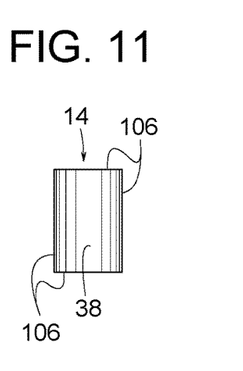
FIG. 11 is a right end view of FIG. 9.
Figure 12:
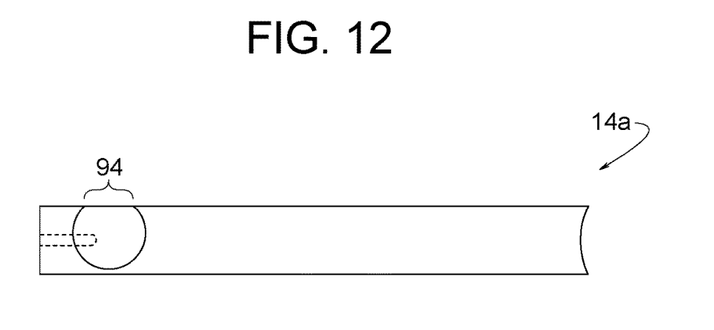
FIG. 12 is a top view of an example commutator brush similar to the one shown in FIGS. 1 and 5-11 but with the brush having only one slot open to the spring-containing cavity of the brush.
Figure 13:
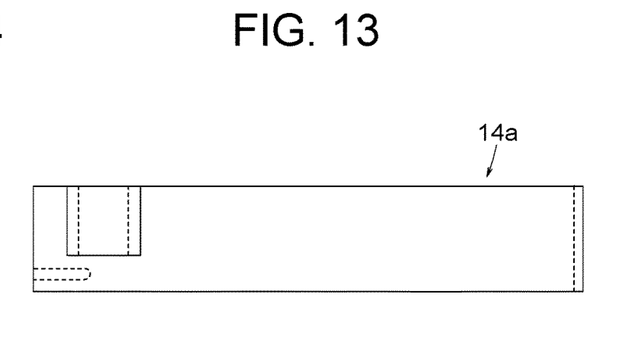
FIG. 13 is a front view of FIG. 12.
Figure 14:
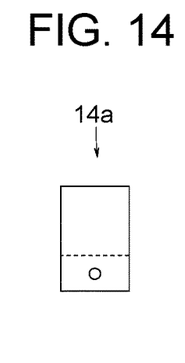
FIG. 14 is a left end view of FIG. 13.
Figure 15:
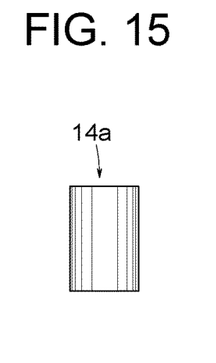
FIG. 15 is a right end view of FIG. 13.

FIGS. 8-11 show various orthogonal views of commutator brush 14 itself. FIG. 8 is a top view, FIG. 9 is a side view looking at a second side 40 of brush 14, FIG. 10 is an end view looking at the brush's back end 30, and FIG. 11 is an end view looking at the brush's front end 38.

In the example shown in FIG. 1, motor 10 generally comprises an inboard end 42 and an outboard end 44, wherein inboard end 42 is the part of motor 10 that is closest to driven member 12. More specifically, motor 10 comprises a housing 46 at inboard end 42, a bracket 48 at outboard end 44, a laminated stator core 50 interposed between housing 46 and bracket 48, at least one field winding 20 supported by stator core 50, an inboard bearing 54 supported by housing 46, an outboard bearing 56 supported by bracket 48, a rotor 58 with a shaft 60 supported by inboard bearing 54 and outboard bearing 56, at least one rotor winding 22 carried by rotor 58, commutator 16 on rotor 58, two commutator brushes 14 supported by bracket 48, spring 26 pressing each brush 14 against commutator 16, wire shunt 24 connected to each brush 14, at least two rotor winding leads 36 connected to stator winding 22, and two electrical terminals 62 (first terminal 62a and second terminal 62b) for connecting stator winding 20 to a power source 64 (e.g., household electrical outlet, single-phase AC electrical supply, a battery, etc.).

Some examples of motor 10 include a cooling fan 66 and various ventilation passages 68 for cooling motor 10.

Some but not all examples of bracket 48 are made of plastic to provide electrical insulation between two brushes 14. In some examples, electrical current 18 passes in series from first terminal 62a, through a first stator winding lead 70, through one stator winding 20, through a second stator winding lead 70, through electrically conductive sleeve 32, through one wire shunt 24, through one brush 14, through commutator 16, through one rotor winding 22, through another rotor winding 22, back through commutator 16, through another brush 14, through another wire shunt 24, through another electrically conductive sleeve 32, through a third stator winding lead 70, through another stator winding 20, through a fourth stator winding lead 70, and to second terminal 62b. It should appreciated by those of ordinary skill in the art, that the just-described electrical circuit arrangement is just one example of many known circuits for commutated motors for which brush 14 can be applied. Brush 14, for example, can be used on a variety of motors including those commonly referred to as brush-type electric motors, commutated motors, brush-type permanent magnet motors, permanent magnet direct current motors (PMDC), AC series motors, brush-type series motors, and universal motors.

Electrical connections can be established by various known means. For instance, in some examples, one end 24a of wire shunt 24 is electrically spot welded to a tab 72 on an electrically conductive version of sleeve 32, while an opposite attached end 24b of wire shunt 24 is tamped tightly into a hole 74 extending into the brush's back end 30. Other means for attaching the shunt's end 24a to tab 72 include various other known welding methods, brazing, soldering, and mechanically fastening (e.g., screw, crimp, clamp, terminal connector, etc.). In some examples, spring force presses one end 76 of stator winding lead 70 firmly against electrically conductive sleeve 32, which facilitates motor assembly and brush replacement.

To urge brush 14 toward commutator 16, spirally rolled-up spring 26 provides spring loaded interaction between brush 14 and sleeve 32. In some examples, spring 26 comprises an outer end 26b attached to sleeve 32, wrapped section 26a disposed in cavity 28, and an intermediate section 26c extending between wrapped section 26a and outer end 26b. Section 26a is coiled (wrapped in a generally non-helical pattern) about a spring axis 78, which is substantially perpendicular to the direction that outer end 26b extends and retracts. In the illustrated example, outer end 26b hooks onto a forward edge of sleeve 32. Outer end 26b being hooked onto sleeve 32 means that the spring's outer end 26b is in the shape of a hook (e.g., J-shaped, U-shaped, etc.), and it is that shape that helps hold the spring's outer end 26b to sleeve 32. With spring 26 at least partially extended, as shown in FIGS. 5 and 6, the spring's wrapped section 26a exerts pressure against a forward pocket face 80 of cavity 28 to press brush 14 against commutator 16 with substantially constant force. Sliding contact between wrapped section 26a and the brush's pocket face 80 helps lubricate spring 4 with graphite from brush 4.

Referring to FIGS. 8-11, brush 14 itself is elongate in longitudinal direction 34 and comprises front end 38, back end 30, cavity 28, a main body 82 between cavity 28 and front end 38, and a bridge 84 between main body 82 and back end 30. Cavity 28 is bordered by forward pocket face 80, a rear pocket face 86, and bridge 84. In some examples, forward pocket face 80 curves about a forward face axis 88, rear pocket face 86 curves about a rear face axis 90, and both pocket faces 80 and 86 are substantially parallel to spring axis 78 when the spring's wrapped section 26a is installed within cavity 28. In the illustrated example, pocket face axes 88 and 90 are collinear.

Brush 14 also includes a first side 92 and second side 40, both of which are elongate in longitudinal direction 34 and extend from the brush's front end 38 to back end 30. First side 92 defines a first slot 94 that is open to cavity 28, so spring 26 extends through first slot 28. First slot 94 has a first span distance 96 extending in longitudinal direction 34 from forward pocket face 80 to rear pocket face 86. Likewise, second side 40 defines a second slot 98 that is open to cavity 28. Second slot 98 has a second span distance 100 extending in longitudinal direction 34 from forward pocket face 80 to rear pocket face 86.

In some examples, each span distance 96 and 100 is less than an outer diameter 102 of the spring's wrapped section 26a, so spring 26 does not readily fall out of cavity 28 during motor assembly. In some examples, first span distance 96 is greater than second span distance 100, so the spring's wrapped section 26a can be slightly biased toward first side 92, which helps spring 26 reach around a forward edge 104 of first slot 94 and extend forward along first side 92 to hook onto sleeve 32.

In some examples, as shown in FIGS. 12-15, an example brush 14a includes only first slot 94. Second slot 98 is omitted. Having just one slot 94 helps further shelter spring 26, adds strength to brush 14a, and ensures spring 26 extends through the desired slot.

Spring 26 and the geometry of brush 14 provide several benefits. For example, cavity 28 in the shown position leaves back section 30 intact where it can serve as a barrier for preventing wire shunt 24 from interfering with the spring's wrapped section 26a. More specifically, the illustrated example shows front end 38 having a first outer periphery 106 lying perpendicular to longitudinal direction 34, back end 30 having a second outer periphery 108 lying perpendicular to longitudinal direction 34, and the two outer peripheries 106 and 108 are substantially equal in size.

Other benefits include pocket faces 80 and 86 being curved, which adds strength to a relatively thin bridge 84. Pocket faces 80 and 86 being curved also provide sufficient space for housing the spring's wrapped section 26a while creating slots 94 and 98 that are sufficiently narrow to prevent wrapped section 26a from accidentally falling out of cavity 28 during motor assembly. And wire shunt 24 extending into bridge 84 increases the bond between shut 24 and brush 14 while maximizing the useful length or life of brush 14.

Further benefits pertain to the shape and size of bridge 84 and the orientation of spring 26 with respect to the geometry of brush 14. In the illustrated example, commutator brush 16 has a brush length 110 extending in longitudinal direction 34, a brush width 112 extending perpendicular to longitudinal direction 34, and a brush thickness 114 perpendicular to both brush width 112 and longitudinal direction 34; wherein brush width 112 is less than brush length 110, brush thickness 114 is less than brush width 112, and spring axis 78 is substantially parallel to brush width 112 when the spring's wrapped section 26a is installed in cavity 28. Such a design provides sufficient brush surface contact area with commutator 16 and sufficient bridge thickness while minimizing diameter 102 of spring 26. In some examples, bridge 84 has a bridge width 116 and a bridge thickness 118, wherein bridge thickness 118 is less than half of brush width 112, which provides sufficient space for cavity 28 while providing bridge 84 with sufficient strength.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A motor for turning a driven member at an inboard end of the motor, the motor comprising:
 a housing at the inboard end of the motor;
 a bracket at an outboard end of the motor;
 a stator core interposed between the housing and the bracket;
 an inboard bearing supported by the housing;
 an outboard bearing supported by the bracket;
 a rotor supported by the inboard bearing and the outboard bearing;
 a rotor winding supported by the rotor;
 a commutator supported by the rotor;
 a commutator brush having a front end and a back end, the front end engaging the commutator, the commutator brush being elongate in a longitudinal direction that extends from the front end to the back end of the commutator brush, the commutator brush having a forward pocket face and a rear pocket face defining a cavity therebetween, the cavity being at an intermediate position between the front end and the back end of the commutator brush, the front end of the commutator brush being closer to the forward pocket face than to rear pocket face, the back end of the commutator brush being closer to the rear pocket face than to the front pocket face;
 a wire shunt having an attached end connected to the back end of the commutator brush; and
 a rolled-up spring having an outer end and a wrapped section, the wrapped section being disposed within the cavity such that the wrapped section engages the forward pocket face of the commutator brush.

2. The motor of claim 1, wherein the front end of the commutator brush is closer to the attached end of the wire shunt than to the rear pocket face of the commutator brush.

3. The motor of claim 1, wherein the front end of the commutator brush has a first outer periphery lying perpendicular to the longitudinal direction, the back end of the commutator brush has a second outer periphery lying perpendicular to the longitudinal direction, and the first outer periphery and the second outer periphery are substantially equal in size.

4. The motor of claim 1, wherein the commutator brush has a brush length extending in the longitudinal direction, the commutator brush has a brush width extending perpendicular to the longitudinal direction, the commutator brush has a brush thickness perpendicular to both the brush width and the longitudinal direction, the brush width being less than the brush length, the brush thickness being less than the brush width, and the wrapped section being coiled about a spring axis that is substantially parallel to the brush width of the commutator brush.

5. The motor of claim 1, wherein the commutator brush includes a main body extending between the front end and the forward pocket face, the commutator brush includes a bridge extending between the main body and the back end, the bridge also extending between the forward pocket face and the rear pocket face, the bridge being adjacent to the cavity, the bridge having a bridge width and a bridge thickness, the commutator brush having a brush length extending in the longitudinal direction, the commutator brush having a brush width extending perpendicular to the longitudinal direction, the commutator brush having a brush thickness perpendicular to both the brush width and the longitudinal direction, the brush width being less than the brush length, the brush thickness being less than the brush width, and the bridge thickness being less than half the brush width.

6. The motor of claim 5, wherein the wire shunt extends into the bridge.

7. The motor of claim 1, further comprising a sleeve attached to the bracket, and the commutator brush being in sliding relationship with the sleeve.

8. The motor of claim 1, further comprising a sleeve attached to the bracket, the commutator brush being in sliding relationship with the sleeve, and the outer end of the rolled-up spring being hooked onto the sleeve.

9. The motor of claim 1, wherein the forward pocket face curves about a forward face axis that is substantially parallel to a spring axis about which the wrapped section is coiled.

10. The motor of claim 1, wherein the rear pocket face curves about a rear face axis that is substantially parallel to a spring axis about which the wrapped section is coiled.

11. The motor of claim 1, wherein the commutator brush includes a first side being elongate in the longitudinal direction and extending from the front end to the back end of the commutator brush, the commutator brush further includes a second side being elongate in the longitudinal direction and extending from the front end to the back end of the commutator brush, the first side being substantially parallel to the second side, the forward pocket face extending between the first side and the second side, the rear pocket face extending between the first side and the second side, the first side defining a first slot open to the cavity, the first slot having a first span distance extending in the longitudinal direction from the forward pocket face to the rear pocket face, the first span distance being less than an outer diameter of the wrapped section of the rolled-up spring.

12. The motor of claim 11, wherein the second slot has a second span distance extending in the longitudinal direction from the forward pocket face to the rear pocket face, the second span distance being less than the outer diameter of the wrapped section of the rolled-up spring.

13. A motor for turning a driven member at an inboard end of the motor, the motor comprising:
 a housing at the inboard end of the motor;
 a bracket at an outboard end of the motor;
 a stator core interposed between the housing and the bracket;
 an inboard bearing supported by the housing;
 an outboard bearing supported by the bracket;
 a rotor supported by the inboard bearing and the outboard bearing;
 a rotor winding supported by the rotor;
 a commutator supported by the rotor;
 a commutator brush having a front end and a back end, the front end engaging the commutator, the commutator brush being elongate in a longitudinal direction that extends from the front end to the back end of the commutator brush, the commutator brush having a forward pocket face and a rear pocket face defining a cavity therebetween, the cavity being at an intermediate position between the front end and the back end of the commutator brush; the front end of the commutator brush being closer to the forward pocket face than to rear pocket face, the back end of the commutator brush being closer to the rear pocket face than to the front pocket face;
a wire shunt having an attached end connected to the back end of the commutator brush, the front end of the commutator brush being closer to the attached end of the wire shunt than to the rear pocket face of the commutator brush; and
a rolled-up spring having an outer end and a wrapped section, the wrapped section being disposed within the cavity such that the wrapped section engages the forward pocket face of the commutator brush, the commutator brush having a brush length extending in the longitudinal direction, the commutator brush having a brush width extending perpendicular to the longitudinal direction, the commutator brush having a brush thickness perpendicular to both the brush width and the longitudinal direction, the brush width being less than the brush length, the brush thickness being less than the brush width, and the wrapped section being coiled about a spring axis that is substantially parallel to the brush width of the commutator brush.

14. The motor of claim 13, wherein the front end of the commutator brush has a first outer periphery lying perpendicular to the longitudinal direction, the back end of the commutator brush has a second outer periphery lying perpendicular to the longitudinal direction, and the first outer periphery and the second outer periphery are substantially equal in size.

15. The motor of claim 13, wherein the commutator brush includes a first side being elongate in the longitudinal direction and extending from the front end to the back end of the commutator brush, the commutator brush further includes a second side being elongate in the longitudinal direction and extending from the front end to the back end of the commutator brush, the first side being substantially parallel to the second side, the forward pocket face extending between the first side and the second side, the rear pocket face extending between the first side and the second side, the first side defining a first slot open to the cavity, the first slot having a first span distance extending in the longitudinal direction from the forward pocket face to the rear pocket face, the first span distance being less than an outer diameter of the wrapped section of the rolled-up spring, the second slot having a second span distance extending in the longitudinal direction from the forward pocket face to the rear pocket face, the second span distance being less than the outer diameter of the wrapped section of the rolled-up spring.

16. The motor of claim 13, wherein the commutator brush includes a main body extending between the front end and the forward pocket face, the commutator brush includes a bridge extending between the main body and the back end, the bridge also extending between the forward pocket face and the rear pocket face, the bridge being adjacent to the cavity, the bridge having a bridge width and a bridge thickness, the commutator brush having a brush length extending in the longitudinal direction, the commutator brush having a brush width extending perpendicular to the longitudinal direction, the commutator brush having a brush thickness perpendicular to both the brush width and the longitudinal direction, the brush width being less than the brush length, the brush thickness being less than the brush width, and the bridge thickness being less than half the brush width.

17. A motor for turning a driven member at an inboard end of the motor, the motor comprising:
a housing at the inboard end of the motor;
a bracket at an outboard end of the motor;
a stator core interposed between the housing and the bracket;
an inboard bearing supported by the housing;
an outboard bearing supported by the bracket;
a rotor supported by the inboard bearing and the outboard bearing;
a rotor winding supported by the rotor;
a commutator supported by the rotor;
a commutator brush having a front end and a back end, the front end engaging the commutator, the commutator brush being elongate in a longitudinal direction that extends from the front end to the back end of the commutator brush, the commutator brush having a forward pocket face and a rear pocket face defining a cavity therebetween, the cavity being at an intermediate position between the front end and the back end of the commutator brush; the front end of the commutator brush being closer to the forward pocket face than to rear pocket face, the back end of the commutator brush being closer to the rear pocket face than to the front pocket face;
a wire shunt having an attached end connected to the back end of the commutator brush;
a rolled-up spring having an outer end and a wrapped section, the wrapped section being disposed within the cavity such that the wrapped section engages the forward pocket face of the commutator brush, the commutator brush having a brush length extending in the longitudinal direction, the commutator brush having a brush width extending perpendicular to the longitudinal direction, the commutator brush having a brush thickness perpendicular to both the brush width and the longitudinal direction, the brush width being less than the brush length, the brush thickness being less than the brush width, and the wrapped section being wrapped about a wrapped axis that is substantially parallel to the brush width of the commutator brush, the forward pocket face being curved about a forward face axis that is substantially parallel to a spring axis about which the wrapped section is wrapped; and
a sleeve attached to the bracket, the commutator brush being in sliding relationship with the sleeve, and the outer end of the rolled-up spring being hooked onto the sleeve.

18. The motor of claim 17, wherein the front end of the commutator brush has a first outer periphery lying perpendicular to the longitudinal direction, the back end of the commutator brush has a second outer periphery lying perpendicular to the longitudinal direction, and the first outer periphery and the second outer periphery are substantially equal in size.

19. The motor of claim 17, wherein the commutator brush includes a main body extending between the front end and the forward pocket face, the commutator brush includes a bridge extending between the main body and the back end, the bridge also extending between the forward pocket face and the rear pocket face, the bridge being adjacent to the cavity, the bridge having a bridge width and a bridge thickness, the commutator brush having a brush length extending in the longitudinal direction, the commutator brush having a brush width extending perpendicular to the longitudinal direction, the commutator brush having a brush thickness perpendicular to both the brush width and the longitudinal direction, the brush width being less than the brush length, the brush thickness being less than the brush width, and the bridge thickness being less than half the brush width.

20. The motor of claim 17, wherein the commutator brush includes a first side being elongate in the longitudinal direction and extending from the front end to the back end of the commutator brush, the commutator brush further includes a second side being elongate in the longitudinal direction and extending from the front end to the back end of the commutator brush, the first side being substantially parallel to the second side, the forward pocket face extending between the first side and the second side, the rear pocket face extending between the first side and the second side, the first side defining a first slot open to the cavity, the first slot having a first span distance extending in the longitudinal direction from the forward pocket face to the rear pocket face, the first span distance being less than an outer diameter of the wrapped section of the rolled-up spring, the second slot having a second span distance extending in the longitudinal direction from the forward pocket face to the rear pocket face, the second span distance being less than the outer diameter of the wrapped section of the rolled-up spring.

* * * * *